Oct. 3, 1950 K. P. BILLNER 2,524,419
APPARATUS AND METHOD FOR UTILIZING VACUUM IN MOLDING
PLASTIC MATERIAL, SUCH AS CONCRETE
Filed March 1, 1946 3 Sheets-Sheet 1

INVENTOR.
KARL P. BILLNER
BY
Raymond W. Colton
ATTORNEY

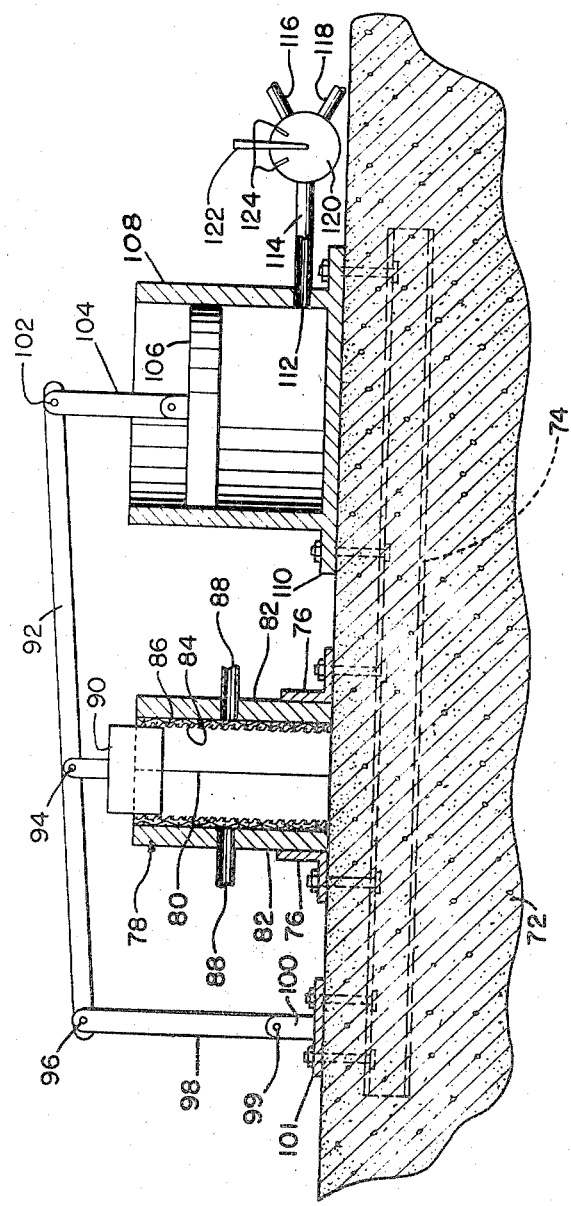

Patented Oct. 3, 1950

2,524,419

UNITED STATES PATENT OFFICE 2,524,419

APPARATUS AND METHOD FOR UTILIZING VACUUM IN MOLDING PLASTIC MATERIAL, SUCH AS CONCRETE

Karl P. Billner, Philadelphia, Pa., assignor to Vacuum Concrete Inc., a corporation of Pennsylvania Application March 1, 1946, Serial No. 651,352

14 Claims. (Cl. 25—1)

The advantages of compact plastic masses have been known in the art for some years. In the case of concrete, dry mixes have been employed rather extensively where strength and low degrees of shrinkage are more important than cost and ease of handling. On July 7, 1936, the present inventor received Letters Patent 2,046,867 pertaining to the removal of excess water from a concrete mix by the use of suction, a method which has since been widely adopted throughout the industry.

By the use of the vacuum mats in the patent referred to, not only is the excess water removed from the newly laid concrete, but atmospheric pressure is simultaneously utilized to consolidate the mass while the water is being extracted. Whereas excellent results have accrued with the apparatus and method of the patent, the pressures realized upon the mass to be compacted will only approximate atmospheric pressure.

It has now been found that if the compacting pressure imposed upon the concrete can be made to exceed atmospheric pressure in connection with practical construction, an even denser mass will result accompanied by greater strength, longer life and reduced shrinkage.

The preferred method for achieving these greater compacting forces is by the use of suction or vacuum, particularly where the new method and apparatus is combined with the removal of excess water, since the equipment employed will permit the use of the source of subatmospheric pressure already available. Paradoxical as it may sound at the outset, the superatmospheric pressure is most conveniently and effectively produced through the use of subatmospheric pressure.

The apparatus of the present invention and the method herein proposed are applicable to the molding of plastics generally, to the molding of plastics containing excess vehicle and more specifically to the molding of concrete containing excess water. It should be noted that the term "excess" as applied to the vehicle or water, contemplates that quantity which is present purely to achieve plasticity and unnecessary insofar as the physical and chemical changes accompanying the setting are involved.

The method can be practiced by applying a surface of relatively small area to the material to be compacted and transmitting to that surface the force of atmosphere upon a surface of relatively larger area whose opposite surface is exposed to subatmospheric pressure. Simultaneously, with this application of superatmospheric pressure to the body to be compacted, excess water or other vehicle can be extracted from the body in a manner analogous to that disclosed in the prior patent referred to.

A more complete understanding of the invention will follow from a detailed description of the accompanying drawings wherein Fig. 1 is a fragmentary bottom plan of apparatus for practicing the invention;

Fig. 5 is a somewhat diagrammatic sectional elevation of another form of apparatus for use in practicing the invention.

Figure 1:
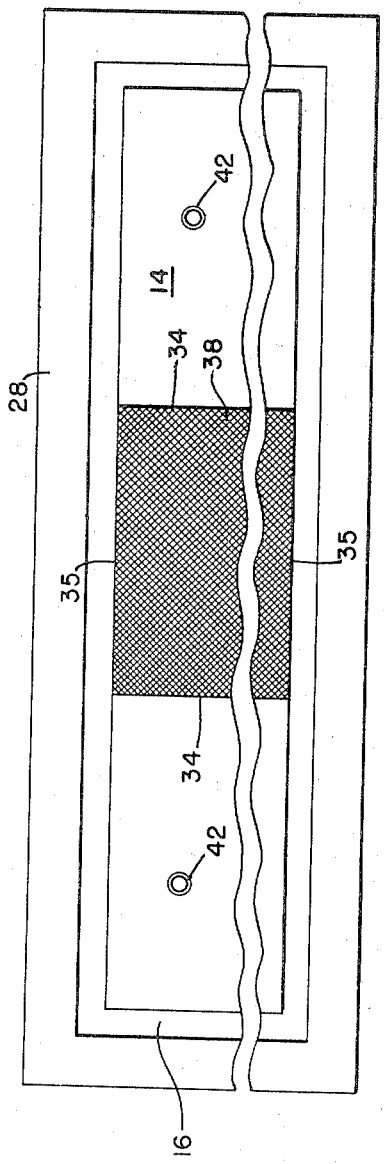
Figure 2:
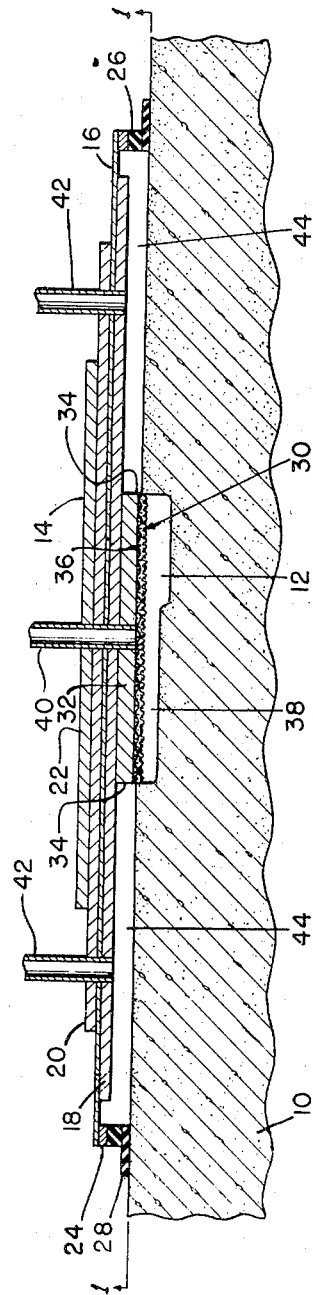
Fig. 2 is a sectional elevation of the apparatus shown in Fig. 1.

A concrete mold 10 depicted in Fig. 2 is shown as provided with a cavity 12 in its upper surface of a type suitable for the production of concrete shingles. The follow body 14 employed for the extraction of excess water from the deposited concrete mix and for the application of superatmospheric pressure at the same time, is depicted in Fig. 1 as being of indefinite length, since the dimensions of the product will dictate those of the hollow body. The laminated structure constituting the upper surface of the hollow body comprises a resilient sheet 16, preferably of spring steel or other suitable metal sandwiched between relatively rigid sheets 18 and 20 which may be of wood or metal, and an upper reinforcing sheet 22, likewise relatively rigid and composed of wood or metal. The resilient sheet 16 is provided with a marginal attaching strip 24 extending around its entire periphery, to which is fixed by means of an adhesive or other suitable means, a relatively flexible and resilient sealing element 26 provided with an outwardly directed peripheral flap 28 which may be integral therewith or attached thereto. The flap 28 being relatively thin and flexible will insure a preliminary seal despite irregularities of the type usually encountered on concrete surfaces.

A mat 30 for the extraction of excess vehicle from the body being molded and for application of the force of atmosphere thereto is arranged more or less centrally of the hollow body 14 and comprises a structure including a frame plate 32, having sides 34, ends 35 and a perforate bottom member which may be composed of one or more layers of foraminous material 36 such as wire screening, hardware cloth, or the like, covered by an outer surfacing material 38 of suitable fabric such as woven glass cloth.

In communication with the perforate surface of the mat 30, there is provided a nipple 40 or other suitable connection to a source of subatmospheric pressure, not shown. The nipple is shown as penetrating the sheet material constituting the upper surface of the apparatus and the frame plate of the mat. In a similar manner, nipples 42 for connection with a source of subatmospheric pressure have been shown as penetrating the upper surface of the apparatus on either side of the mat 30 to establish communication with one or more sources of subatmospheric pressure.

After deposition of the required quantity of plastic material in the cavity 12, the apparatus described will be assigned the position shown in Figure 2 of the drawing so that the mat 30 is in registry with the material to be compacted, whereupon the nipples 40 and 42 will be connected by means of suitable valves, not shown, to a suction pump in a desired order. When the nipples 42 are connected to the pump, the flexible flap 28 composed of thin rubber sheeting or the like will immediately be drawn in contact with the surface of the floor or table 10. After the seal has been established, as the air is exhausted from the spaces 44 between the hollow body and the surface of the mold, the sealing elements 26 of rubber or like material, which are preferably quite yieldable, will become flattened to a rather material extent. Connection of the nipple 40 to the pump will cause the excess water from the deposited concrete to be extracted through the fabric and foraminous layers and exert a compacting force upon the material being molded resulting from the differential pressures existing between atmosphere and the interior of the hollow body. Since the surface area of the hollow body exceeds that of the surface applied to the deposited material being compacted, it will follow that by varying the relative areas of these surfaces, a great range of pressures can be utilized. Naturally, the construction of the hollow body and the mat itself will be computed to withstand the forces imposed during use of the apparatus.

Figure 3:
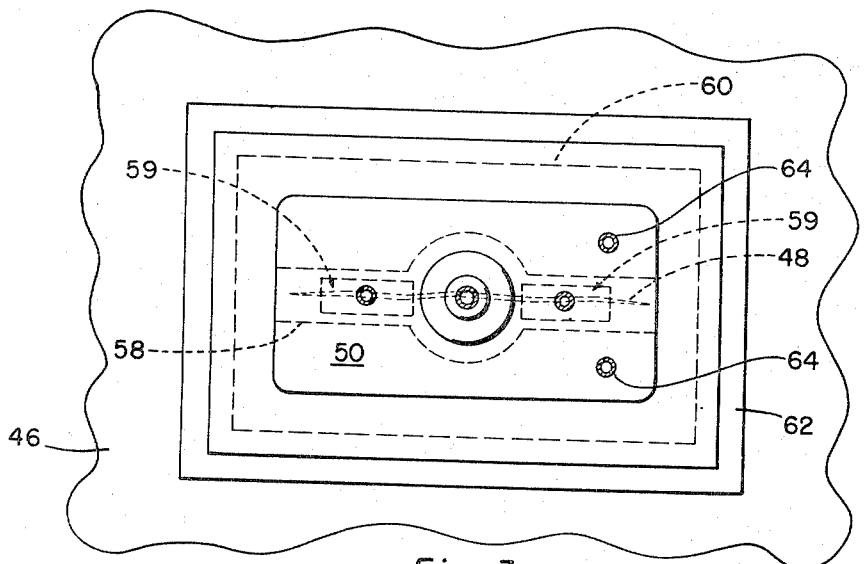
Fig. 3 is a plan of apparatus suitable for sealing cracks.
Figure 4:
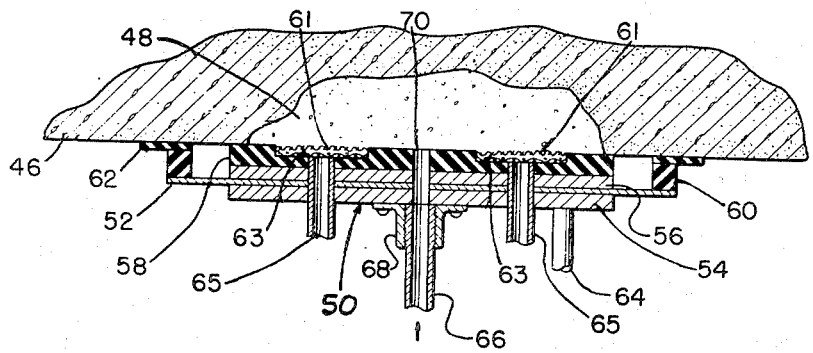
Fig. 4 is a sectional elevation of the showing in Fig. 3.

Figs. 3 and 4 illustrate the application of one aspect of the invention to the grouting of cracks of the type which frequently occur in concrete structures. The wall, floor, ceiling or other body 46 to be repaired is shown as containing a crack 48 into which it is desired to inject grouting material under various pressures including those exceeding the pressure of atmosphere. In this case, the hollow body 50 comprises a resilient sheet 52 of spring steel or other appropriate material, sandwiched between outer and inner rigid reinforcing sheets 54 and 56 respectively. Suitably affixed to the inner sheet 56 of suitable wood or metal construction, is a flowable resilient sealing element 58 of rubber or similar material intended to seat over the crack to be filled. The resilient sheet 52 is provided with marginal gasketing material 60 of soft rubber or similar readily deformable resilient material which has integral therewith or attached thereto a thin flap 62 of sheet rubber or other similar material capable of effecting a seal as soon as the external pressure exceeds the internal pressure of the hollow body. Embedded in the sealing element 58 so as to be substantially flush with its surface, are a plurality of perforate bodies 59 comprising surface layers of woven glass fabric 61 applied over wire screening or hardware cloth layers 63, adapted for communication with a source of subatmospheric pressure through suitable nipples 65 penetrating the laminations of the hollow body 50 and the sealing element 58.

Penetrating the upper surface of the hollow body for connection with a source of subatmospheric pressure on either side of the sealing element 58, there are provided nipples 64 or other suitable connections. Grouting material is introduced under pressure through a nipple 66 or the like threaded into a flange 68 suitably secured to the outer surface of the hollow body. The nipple 66 registers with an aperture which may be lined or formed as a continuation of the nipple itself, extending through the laminated structure 52, 54, 56 and 58.

In operation, the hollow body 50 will be applied to the concrete structure containing the crack to be repaired, whereupon the nipple 64 will be connected to a source of subatmospheric pressure resulting in the flaps 62 taking hold upon the surface even though it contain substantial irregularities, whereupon the hollow body will be retained in position whether it be upon a wall, ceiling, floor, road, beam, or other body, whatever its inclination. As the air is exhausted from within the hollow body, the sealing member 58 will bear down with increasing force and depending upon its area as compared with that of the sheet 52, the pressure exerted can vary from values below atmospheric pressure to values many times exceeding such pressure. The grout can be introduced at this point through the nipple 66 and the registering passage 70 to fill the crack 48 at a pressure compatible with that existing between the sealing element 58 and the surfaces adjacent the crack. Connection of the nipples 65 with a source of subatmospheric pressure will cause excess water or other vehicle to be extracted from the grout through the perforate surfacing bodies, simultaneously with the application of compacting pressure to the grout.

The apparatus depicted in Fig. 5 of the drawing illustrates another form of the invention adapted for simultaneously removing excess vehicle from the plastic body and applying superatmospheric pressure for compacting it. A base 72, suitably formed of concrete may have embedded therein a channel 74 or similar structural member to which various elements of the apparatus may be anchored. One or more retaining members 76 of angular cross-section are shown as suitably anchored to the channel 74. These retaining members will receive a cross-section in plan corresponding to that defined by the separable form 78 which may be parted at its meeting edges 80. The form is made up of two or more mats 82 having perforate surfaces for contact with the plastic body to be molded. These perforate surfaces may, as in a previous case, be provided by a sheet of suitable fabric 84 such as woven glass supported by a foraminous backing member 86 such as screening or hardware cloth. Each of the mats or perforate surface bodies is provided with a nipple 88 or the like for communication with a source of subatmospheric pressure, not shown.

A piston 90 corresponding in plan to the cross-section of the cavity formed at the upper end of the separable form 78, is suspended from a lever 92 by means of a pivot 94, one end of the lever having a fulcrum defined by a pivot 96 supported by a link 98, which is connected through a pivot 99 to a pair of ears 100 carried by a flanged support 101 which is suitably anchored to the channel 74. Depending from the other end of the lever 92 by a pivot 102 is a link 104 whose lower end pivotally supports a piston 106 received in a cylinder 108 having a peripheral flange 110 by which it is also secured to the channel 74. The lower end of the cylinder 108 below the normal path of the piston 106 is provided with a port 112 for reception of a nipple 114 for selective communication with a source of subatmospheric pressure through a line 116 and a source of superatmospheric pressure through a line 118. The selection is made by means of a selector valve 120 of commercial construction having an operating handle 122 and suitable stops 124 which limit its extreme positions.

In operation, the piston 106 will be assigned an upper position providing sufficient clearance for insertion of the separable form members 82, whereupon the material to be molded will be introduced into the form to a desired height. Suitable provision will be made to seal the upper ends of the form with respect to the piston 90 so that when the nipples 88 are connected with a vacuum pump, there will be no leakage of air and the excess water or other vehicle from the plastic mix will be extracted. The valve handle 122 will be manipulated to connect the nipple 114 and the lower end of the cylinder with the source of subatmospheric pressure with the result that atmospheric pressure will be applied to the upper surface of the piston 106 to force it downwardly and transmit such force through the lever 92 to the piston 90. Since the upper surface of the piston 106 can be made many times greater than the contact surface of the piston 90 applied to the plastic mix, it may be said that atmospheric pressure is multiplied through the use of subatmospheric pressure. After suction has been applied to the various components for a predetermined time, and which in some cases might be as little as one minute, the valve handle 122 can be moved to its other extreme position admitting superatmospheric pressure to the lower surface of the piston 106 to raise it and the compacting piston 90 to a height sufficient to permit removal of the separable form 78 and the molded body produced.

The many possible applications of this invention adapts it for use in the field as well as at prefabricating plants in connection with a large variety of plastic materials. The examples described and illustrated in the drawings are intended only as illustrative and accordingly, the invention should not be limited thereto beyond the scope of the appended claims.

I claim:

1. A method for producing compact cementitious bodies comprising depositing cementitious material in plastic condition containing excess vehicle and applying subatmospheric pressures to exert superatmospheric pressure on the material on the one hand and withdraw excess vehicle therefrom on the other.

2. A method for producing compact plastic bodies comprising depositing plastic material containing excess vehicle and applying subatmospheric pressure to subject a surface thereof to superatmospheric pressure on the one hand and simultaneously withdraw vehicle therefrom on the other.

3. A method for producing compact plastic bodies comprising flowing plastic material into a cavity, applying suction to an exposed surface of the material and to an area extending beyond and exceeding said surface while excluding atmosphere, and transmitting compacting forces to said surface substantially equal to the product of the pressure difference between said suction and atmosphere and the ratio of said area to said surface.

4. A method for producing compact concrete bodies comprising depositing a concrete mix in a cavity, applying suction to an exposed surface of the mix and to an area exceeding said surface extending therebeyond while excluding atmosphere, and imposing compacting pressures upon the exposed surface of the mix, said pressures being substantially the product of the pressure difference between said suction and atmosphere and the ratio of said area to said surface.

5. Apparatus for treating a plastic material containing excess vehicle comprising a body having a perforate surface for application to a portion of said material, means for connecting said perforate surface with a source of subatmospheric pressure for removing excess vehicle and suction actuated atmospheric pressure-multiplying means for simultaneously compacting said material.

6. Apparatus for treating concrete containing excess water comprising a hollow body having a perforate surface for application to a portion of said concrete, means for connecting said perforate surface with a source of subatmospheric pressure for removing excess water, and subatmospheric pressure actuated means for simultaneously applying superatmospheric compacting forces to the concrete.

7. Apparatus for compacting a plastic material comprising a base having a first surface for exposure to atmosphere and a second surface for exposure to said material, a perforate surface smaller than said second surface and projecting therefrom for direct contact with said material, means for connecting said perforate surface and second surface of said base with a source of subatmospheric pressure, and sealing means on said second surface for excluding atmosphere from between said material and base.

8. Apparatus for compacting plastic material comprising a body presenting a first surface including a smaller projecting compacting surface to said material, said body having a second surface exposed to atmosphere and of greater area than said compacting surface, and means for excluding ambient atmosphere from and subjecting said first surface including said compacting surface to a source of subatmospheric pressure for applying the force of atmosphere imposed upon said exposed surface, to said material.

9. Apparatus for compacting plastic material comprising a body having a relatively large area exposed to atmosphere and an opposed substantially equal area exposed to said material, means projecting from said opposed area providing a surface of relatively small area for direct application to said material to transmit compacting force from said body to said material, peripheral sealing means carried by said opposed area, and means for connecting said opposed surface of said body including said surface of small area with a source of subatmospheric pressure.

10. Apparatus for treating a plastic material containing excess vehicle comprising a base having a surface for exposure to atmosphere and an opposed surface including projecting means providing a perforate surface for application to a portion of said material for removing excess vehicle, means providing a seal surrounding said opposed surface over an area greater than that of said perforate surface, and means for connecting the opposed surface and perforate surface with a source of subatmospheric pressure.

11. Apparatus for treating a plastic material containing excess vehicle comprising a hollow body having a perforate surface of relatively small area for contact with a portion of said material for removing excess vehicle, a hollow body of relatively large area, means interconnecting said bodies for transmitting force between said bodies, and means for connecting the hollow portions of said bodies with a source of subatmospheric pressure.

12. Apparatus for treating concrete containing excess water comprising a hollow body having an open surface provided with marginal yieldable sealing material, a perforate surface projecting from said open surface and of smaller area than said open surface surrounded by the sealing material of said body for contact with a portion of said concrete for removing excess vehicle therefrom, and means for connecting the hollow portion of said body and perforate surface with a source of subatmospheric pressure.

13. A method for producing compact plastic bodies comprising depositing plastic material containing excess vehicle to present an exposed surface, applying subatmospheric pressure to said surface to withdraw excess vehicle therefrom, simultaneously applying subatmospheric pressure to a surface exceeding the area of the first said surface to produce a differential force, and transmitting said differential force to the first said surface.

14. Apparatus for treating a plastic body containing excess vehicle comprising means providing a perforated surface for application to an exposed area of a plastic body containing excess vehicle, force transmitting means connected with said perforated surface means and having opposed relatively rigid surfaces each larger than said area, one of said opposed surfaces communicating with atmosphere, and means for connecting said perforated surface and the other of said opposed surfaces with a source of subatmospheric pressure for simultaneously compacting said body and removing excess vehicle therefrom.

KARL P. BILLNER.

REFERENCES CITED

The following references are of record in the file of this patent:

UNITED STATES PATENTS

| Number | Name | Date |
|---|---|---|
| 377,858 | Lawrence | Feb. 14, 1888 |
| 1,468,602 | Loughead | Sept. 18, 1923 |
| 1,909,444 | Worrall | May 16, 1933 |
| 2,046,867 | Billner | July 7, 1936 |
| 2,173,593 | Phelps | Sept. 19, 1939 |
| 2,196,874 | Ruegg | Apr. 9, 1940 |
| 2,474,721 | Billner | June 28, 1949 |